United States Patent [19]

Hengesbach et al.

[11] Patent Number: 5,419,664
[45] Date of Patent: May 30, 1995

[54] EXPANSIBLE ANCHOR AND METHOD OF MAKING SAME

[75] Inventors: Wolfgang Hengesbach, Dornstetten; Ralf Köpff, Glatten; Burkhard Mayer, Herrenberg; Eberhard Mäder, Eutingen; Gerhard Porlein, Waldachtal; Jürgen Striebich, Horb, all of Germany

[73] Assignee: fischerwerke, Artur Fischer GmbH & Co. KG., Waldachtal, Germany

[21] Appl. No.: 153,174

[22] Filed: Nov. 16, 1993

[30] Foreign Application Priority Data

Nov. 26, 1992 [DE] Germany .......... 42 39 763.4
Jul. 20, 1993 [DE] Germany .......... 43 24 244.8

[51] Int. Cl.⁶ .............................. F16B 13/06
[52] U.S. Cl. .......................... 411/61; 411/60; 411/74; 405/259.1; 52/704
[58] Field of Search ............ 405/259.1, 259.5, 259.6; 411/61, 60, 54, 74, 72; 52/698, 704

[56] References Cited

U.S. PATENT DOCUMENTS 2,075,952  6/1937  McIntosh .
3,709,089  1/1973  Seetaram ................ 411/61
3,750,526  8/1973  Lerich .................. 411/61

FOREIGN PATENT DOCUMENTS 0870345  5/1971  Canada ................. 411/61
0514342  11/1992  European Pat. Off. .
2131306  11/1972  France .
2611005  8/1988  France .
2554851  6/1976  Germany ............... 411/61
2836347  5/1986  Germany .
3601597  7/1987  Germany .
51-127958  8/1976  Japan .
0591637  9/1977  Switzerland .......... 411/61
2254392  10/1992  United Kingdom .
536760  1/1977  U.S.S.R. .
1302038  4/1987  U.S.S.R. .
1303043  4/1987  U.S.S.R. .
1506188  9/1989  U.S.S.R. .
1530837  12/1989  U.S.S.R. .
1602400  10/1990  U.S.S.R. .
1664120  7/1991  U.S.S.R. .
1670203  8/1991  U.S.S.R. .
1670204  8/1991  U.S.S.R. .

Primary Examiner—Dennis L. Taylor
Attorney, Agent, or Firm—Michael J. Striker

[57] ABSTRACT

The expansible anchor consists of a shank having a threaded portion for fixing an article at its rear end and a reduced cross-sectioned portion with an adjoining expander cone at its front end, and, positioned over the reduced cross-sectioned portion, an expansible sleeve having longitudinal slits forming expansible segments and locking elements protruding beyond the diameter of the expansible sleeve and arranged on the expansible segments. To increase the holding force of the anchor and to allow the expander cone to slide-up and the expansible sleeve to expand in operation if the drilled hole become enlarged as a result of cracks forming, the locking elements consist of several interconnected punched elements on each expansible segment extending in a longitudinal direction of the expansible segments. Each punched element is triangular with a point directed towards the front end of the expansible segments. An improved method of making the expansible anchor which includes stamping a blank for the expansible sleeve somewhat undersized from sheet metal, subsequently pressing it and then punching the punched elements in the expansible sleeve is also described.

10 Claims, 1 Drawing Sheet

EXPANSIBLE ANCHOR AND METHOD OF MAKING SAME

BACKGROUND OF THE INVENTION

The invention relates to an expansible anchor for anchoring in a hole drilled in a component, especially a concrete part.

An expansible anchor for anchoring in a hole drilled in a concrete part is known and consists of a shank having means for fixing an article at its rear end and a reduced cross-section portion with an adjoining expander cone at its front end, and, positioned over the portion of the shank of reduced cross section, an expansible sleeve having longitudinal slits forming expansible segments and locking elements protruding beyond a diameter of the expansible sleeve and arranged on the expansible segments.

Expansible anchors of that kind are especially suitable for anchoring in hard building materials. By screwing a nut onto the threaded shank projecting beyond the component and the article to be fixed, the expander cone integrally formed with the shank is drawn into the expansible sleeve bearing against the wall of the drilled hole. The expansible sleeve is consequently expanded and becomes wedged in the drilled hole. The expansible sleeve is braced in the drilled hole by locking elements provided on it, which catch against the wall of the drilled hole.

Expansion of the expansible sleeve is normally facilitated by several longitudinal slits. The longitudinal slits form expansible segments, however a closed sleeve portion is provided at the end of the longitudinal slits. The holding force of such an expansible anchor depends very considerably on the wall thickness of the expansible sleeve, and is limited to avoid too great a cross-sectional weakening of the reduced portion receiving the expansible sleeve. If the wall thickness is inadequate and the expansible segments are therefore lacking in rigidity, the withdrawal path of the expander cone into the expansible sleeve is relatively long, and this is apparent as a loss in holding force, especially in the case of relatively large drilled holes. The same effect is also apparent when the drilled hole widens subsequently as a consequence of cracks forming. Because the expansible segments buckle behind the expander cone due to inadequate rigidity, there is a considerable loss in holding force. The known expansible anchors are therefore not suitable for use in the tensile zone in which cracks may form as a result of tensile stresses occurring in the concrete.

SUMMARY OF THE INVENTION

It is an object of the present invention to provide an improved expansible anchor of the above kind which guarantees reliable fixing in the tensile zone of a concrete part.

It is also an object of the present invention to provide a method of making the improved expansible anchor of the invention.

These objects and others which will be made more apparent hereinafter are attained in an expansible anchor consisting of a shank having means for fixing an article at a rear end thereof and a portion of reduced cross section with an adjoining expander cone at a front end thereof, and, positioned over the portion of the shank of reduced cross section, an expansible sleeve provided with longitudinal slits forming expansible segments and having locking elements protruding beyond a diameter of the expansible sleeve and arranged on the expansible segments.

According to the invention, the locking elements comprise several interconnected punched elements extending in a longitudinal direction of the expansible segments, each of the punched elements being of a triangular shape with a tip directed towards a front end of the expansible segments.

The longitudinal slits starting at the front end edge and extending over a major part of the length of the expansible sleeve form expansible segments which can be expanded by drawing in the expander cone integrally formed with the shank. The punched elements according to the invention and provided on the expansible segments reinforce the expansible segments so that as the expander cone is drawn into the expansible sleeve these segments bend in less readily and therefore press more firmly into the wall of the drilled hole. The higher degree of expansion achieved thereby inevitably gives rise also to higher holding forces. In the event of the drilled hole widens as a result of crack formation, the expander cone is better able to slide up subsequently since the greater rigidity of the expansible segments reduces the surface pressure on the expander cone. At the same time, the expansible sleeve expands further to compensate for widening of the drilled hole.

The punched elements serve simultaneously as locking elements to fix the expansible sleeve in the drilled hole for the advancing expander cone. The triangular shape of the punched elements with tips pointing towards the front end of the expansible segments creates several edges arranged one behind the other and effective at right angles to the withdrawal direction of the expansible anchor. During the expansion process, these edges dig into the wall of the drilled hole. Because the tips of the punched elements are directed towards the front end of the expansible segments, the expansible anchor can be driven into the prepared drilled hole without difficulty.

In a preferred embodiment of the invention four punched elements per expansible segment provide a satisfactory rigidity of the expansible segments and ensure that the application force needed to drive in the expansible anchor is still reasonable. These punched elements have an overall length corresponding to approximately half the length of the expansible sleeve and a maximum width corresponding to approximately one third of the width of one expansible segment. Furthermore, it is advantageous that the height of the punched elements corresponds approximately to a third of the wall thickness of the expansible sleeve and that each punched element slopes inwardly in the direction of its tip.

In a preferred embodiment, the longitudinal sides of the expansible segments may have several opposing indentations. This increases the flexibility of the expansible segments in the region of the indentations since these indentations reduce the former shell and width of the expansible segments at these points. The expansible segments reinforced by the punched elements are therefore rendered more flexible at one or two points. This facilitates sliding up of the expansible sleeve on the expander cone, so that during expansion less torque is required and subsequent expansion is assisted in the event of the drilled hole widening as a result of crack formation.

To improve the frictional characteristic between the expander cone and the expansible sleeve, the front inner edge of the expansible sleeve may have a bevel. Furthermore, for the same purpose the front corner edges of the expansible segments of the expansible sleeve may be rounded.

The improved method of making the expansible anchor from metal comprises the steps of stamping a blank for the expansible sleeve slightly undersized in relation to the expansible sleeve from sheet metal, pressing the sheet metal to reduce a sheet metal thickness of the blank and, after pressing, punching the locking elements out of the blank. Advantageously after the punching of the locking elements the expansible sleeve is bent into a U-shape.

The pressing of the blank for the expansible sleeve in operation produces a structural change which leads to an improvement in the apparent yielding point. The harder surface of sleeve and the smoothing of the surface as a consequence of the pressing procedure produce improved sliding properties of the expansible sleeve on the expander cone of the expansible anchor, which have a favorable effect both during the expansion process and during subsequent expansion behavior. The improvement in the apparent yielding point is moreover attributable to the expansion sleeve having a portion of greater resilience for deformation. The expansible sleeve consequently acts as a kind of spring element which expands as the drilled hole widens, for example as a result of crack formation, and therefore allows the expander cone to slide up subsequently in the expansible sleeve.

A further advantage of the pressing operation is the enlargement of the stamped sheet steel blank. The longitudinal slit widths are thus somewhat reduced again subsequently and the effective areas of the expansible segments are enlarged. Relatively thick and therefore more wear-resistant stamps can therefore be used to stamp out the slits.

To facilitate expansion of the expansible sleeve on the reduced portion of the expansible anchor, it is advantageous for the expansible sleeve to be bent in a U-shape at the same time as the locking elements are punched out after the pressing operation.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENT

Figure 1:
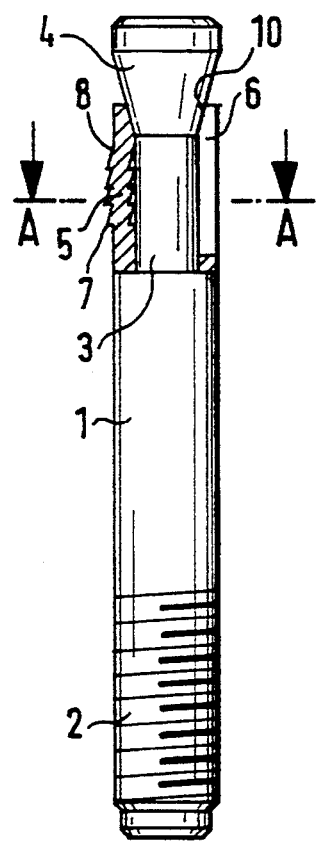
FIG. 1 is a partially side elevational, partially cross-sectional view of an expansible anchor according to the invention with the expansible sleeve taken along the section line B—B of FIG. 2.

The expansible anchor illustrated in FIG. 1 consists of a shank 1 having at its rear end a threaded portion 2 for clamping an article securely. At the front end of the shank 1 remote from the threaded portion 2 the shank 2 is provided with an expander cone 4. The shank 1 has a stepped portion 3 adjacent to the expander cone 4 near the front end. An expansible sleeve 5 has an expansion region formed by longitudinal slits 6 starting from a front end edge of the sleeve. The expansible sleeve 5 is positioned near the stepped portion 3. To fix the expansible sleeve in the drilled hole, locking elements formed by four interconnected punched elements 7 positioned in a longitudinal direction of the expansible segments are provided on the expansible sleeve 5. The punched elements 7 are triangular in shape and the tip 8 of the punched elements 7 is directed towards the front end of the expansible segments. At the same time, the punched elements 7 slope or are inclined inwardly towards the tip 8 to facilitate driving of the expansible anchor into the drilled hole. The height, h, of the punched elements 7 is approximately one third of the wall thickness, t, of the expansible sleeve 5. The front edges of the punched elements 7 therefore form barbs which enable the expansible sleeve 5 to be firmly fixed in the drilled hole. The punched elements 7 protrude beyond a diameter D of a major portion of the expansible sleeve.

In the preferred embodiment shown in the drawing the punched elements have an overall length, $1'$, equal to approximately half the length, L, of the expansible sleeve 5 and a maximum width, $w'$ equal to approximately one third of the width, W, of one expansible segment.

Figure 2:
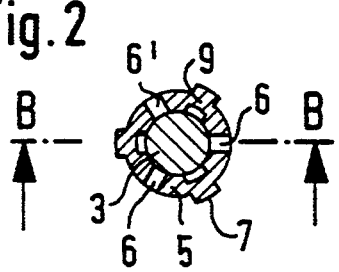
FIG. 2 is a cross-sectional view through the expansible anchor illustrated in FIG. 1 taken along the section line A—A in FIG. 1.

FIG. 2 illustrates the section corresponding to the section line A—A. The longitudinal slits 6, 6' create several expansible segments 9, which expand to anchor the expansible anchor as the expander cone 4 is drawn into the expansible sleeve 5. To facilitate its sliding on the expander cone 4, the expansible sleeve 5 is provided with a bevel 10.

Figure 3:
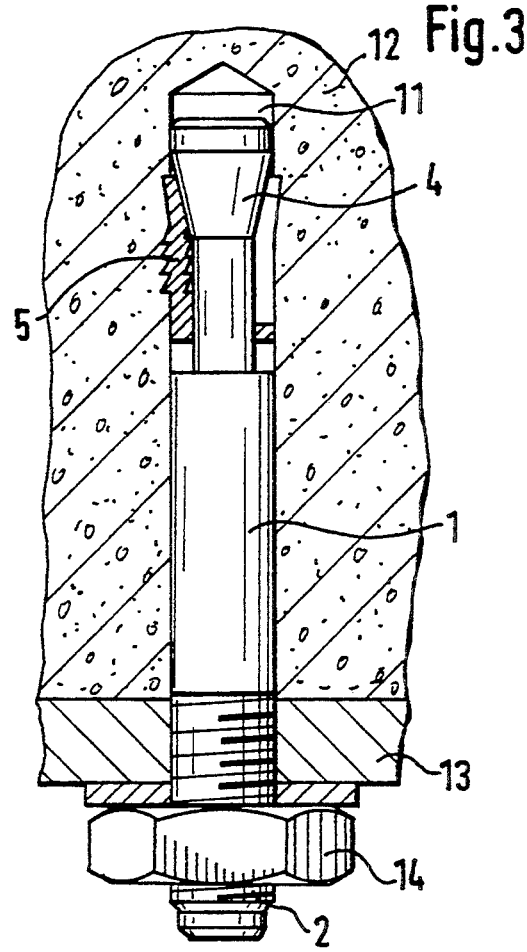
FIG. 3 is a partially cross-sectional view, partially side view of the expansible anchor of FIG. 1 anchored in a hole drilled in a concrete part.

FIG. 3 shows an expansible anchor anchored in a hole 11 drilled in a concrete part 12. The anchoring, and at the same time the clamping of the article 13 to be fastened, is effected by screwing the nut 14 onto the threaded portion 2 of the expansible anchor. Through the axial displacement of the shank 1 of the expansible anchor, the expander cone 4 is drawn into the expansible sleeve 5 held captive in the drilled hole by the locking elements to effect anchoring of the expansible sleeve.

Figure 4:
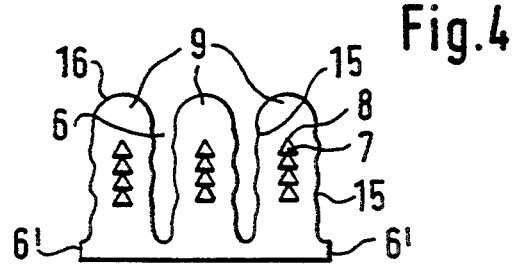
FIG. 4 is a detailed plan view of the expansible sleeve of the anchor of FIG. 1 in the form of a stamped/bent component with the punched elements.

FIG. 4 shows the developed view of an expansible sleeve 5 stamped from sheet metal with three expansible segments 9. Each expansible segment is provided with four punched elements 7, arranged one behind the other in an interlocking manner, the punched elements being of triangular shape with a tip 8 pointing towards the front end. The expansible segments 9 result from the longitudinal slits 6 and extend from the border portion 6' of a rolled up component made from a blank. The longitudinal sides of the expansible segments 9 have indentations 15 which are positioned opposite one another to reduce the width of an expansible segment 9.

The expansible anchor according to the invention is formed by bending a stamped component onto the reduced portion 3 of the shank 1. To reduce the friction between the expander cone and the expansible sleeve, the expansible segments 9 have rounded corner edges 16.

Figure 5:
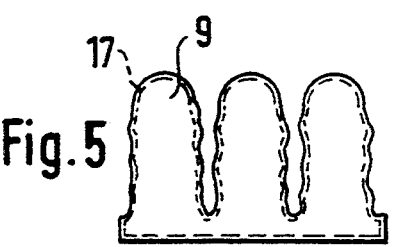
FIG. 5 is a detailed plan view illustrating the results of the stamping and pressing steps for making the blank for the expansible sleeve in the method according to the invention.
Figure 6:
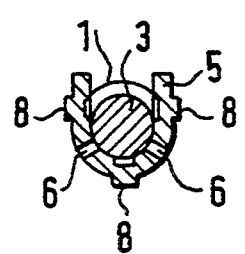
FIG. 6 is a detailed cross-sectional view showing the expansible sleeve for the expansible anchor bent into a U-shaped and pushed onto the reduced cross-sectioned portion of the expansible anchor.

FIGS. 5 and 6 illustrate the improved method of making the expansible sleeve for the anchor.

FIG. 5 shows the stamped metal blank of the expansible sleeve 5 after the pressing operation. The dotted outline 17 shows the stamped contour which is enlarged slightly by the pressing operation to the outer contour shown with the solid line in FIG. 5. After the pressing operation, the locking elements 7 are punched out and, at the same time, the expansible sleeve 5 is bent into a U-shape so that it can be pushed laterally onto the reduced portion 3 of the expansible anchor 1. In a subsequent operation, the longitudinal edges of the expansible sleeve are then bent around the reduced portion 3.

If stainless steel is used for the expansible sleeve, it can be advantageous to provide the expansible sleeve with an additional coating to improve the sliding properties further. A coating process in which a mixture of nickel and Teflon is applied chemically in an immersion process has proved especially advantageous.

While the invention has been illustrated and described as embodied in an expansible anchor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. An expansible anchor for anchoring in a hole drilled in a concrete part, said expansible anchor consisting of a shank having means for fixing an article at a rear end of said shank, a reduced cross-section portion having a reduced cross section and an expander cone at a front end of said shank and adjoining said reduced cross-section portion, and, positioned over the reduced cross-section portion of the shank, an expansible sleeve provided with a plurality of longitudinal slits forming expansible segments in said expansible sleeve and having locking elements protruding beyond a diameter of the expansible sleeve and provide on the expansible segments; and wherein the locking elements comprise at least one plurality of punched elements extending in a longitudinal direction of the expansible segments which punched elements are interconnected so as to eliminate distances between said punched elements and therefore avoid formation of weak points between said punched elements, each of the punched elements being triangular in shape and having a tip directed towards a front end of the expansible segments.

2. An expansible anchor according to claim 1, wherein four of said interconnected punched elements are provided on each of said expansible segments, and said four interconnected punched elements have an overall length equal to about half a total length of said expansible sleeve and a maximum width equal to approximately one third of a width of one expansible segment.

3. An expansible anchor according to claim 1, wherein a height of each of said punched elements corresponds approximately to a third of a wall thickness of the expansible sleeve and each of said punched elements has a tip and is inclined inwardly towards said tip.

4. An expansible anchor according to claim 1, wherein said expansible segments have longitudinal sides provided with a plurality of opposing indentations.

5. An expansible anchor according to claim 1, wherein the expansible sleeve has an inner front edge provided with a bevel for engagement with the expander cone.

6. An expansible anchor according to claim 1, wherein said expansible segments have rounded front corner edges.

7. An expansible anchor according to claim 1, wherein each of said expansible segments is provided with one of said pluralities of said punched elements.

8. An expansible anchor according to claim 7, wherein four of said punched elements are provided on each of said expansible segments, and said four punched elements have an overall length equal to about half a total length of said expansible sleeve and a maximum width equal to approximately one third of a width of one expansible segment.

9. A method of making an expansible anchor consisting of a shank having means for fixing an article are a rear end thereof, a reduced cross-section portion and an expander cone at a front end thereof, said reduced cross-section portion adjoining said reduced cross-section portion, and, positioned over the reduced cross-section portion of the shank, an expansible sleeve provided with a plurality of longitudinal slits forming expansible segments therein and having at least one set of punched elements which punched elements are interconnected so as to eliminate distances between said punched elements and therefore avoid formation of weak points between said punched elements, said punched elements protruding beyond a diameter of the expansible sleeve and provided on the expansible segments, said method comprising the steps of:
 a) stamping a blank from sheet metal for the expansible sleeve slightly undersized in relation to the expansible sleeve;
 b) pressing the blank to reduce a sheet metal thickness of the blank and to simultaneously increase hardness and surface smoothness of the blank; and
 c) after pressing, punching the interlocked punched elements in the blank.

10. Method according to claim 9, further comprising, after the punching of the interlocked punched elements, bending the expansible sleeve into a U-shape for engagement with said reduced cross-sectioned portion.

* * * * *